(12) United States Patent
Jacquemin

(10) Patent No.: US 7,992,995 B2
(45) Date of Patent: Aug. 9, 2011

(54) SPECTACLES HAVING RETRACTABLE SIDEPIECES

(75) Inventor: Didier Jacquemin, La Mouille (FR)

(73) Assignee: Logo SA, Morez (FR)

( * ) Notice: Subject to any disclaimer, the term of this patent is extended or adjusted under 35 U.S.C. 154(b) by 0 days.

(21) Appl. No.: 13/054,505

(22) PCT Filed: May 13, 2009

(86) PCT No.: PCT/FR2009/050885
§ 371 (c)(1),
(2), (4) Date: Jan. 17, 2011

(87) PCT Pub. No.: WO2010/007262
PCT Pub. Date: Jan. 21, 2010

(65) Prior Publication Data
US 2011/0116033 A1    May 19, 2011

(30) Foreign Application Priority Data

Jul. 17, 2008 (FR) ...................................... 08 54855

(51) Int. Cl.
*G02C 5/08* (2006.01)
(52) U.S. Cl. ........................... 351/63; 351/118; 351/119
(58) Field of Classification Search ............ 351/63, 351/118, 119, 153, 41, 158; D16/306, 325, D16/335; 16/228
See application file for complete search history.

(56) References Cited

U.S. PATENT DOCUMENTS

| 3,049,974 | A | * | 8/1962 | Miwa ............................... 351/83 |
| 3,361,515 | A | * | 1/1968 | Vanderbeek .................. 351/121 |
| 5,448,317 | A | | 9/1995 | Huang |
| 6,158,860 | A | | 12/2000 | Huang |
| D437,339 | S | * | 2/2001 | Tsou ............................ D16/306 |
| 6,817,710 | B2 | * | 11/2004 | Benavides et al. ............ 351/115 |
| 2004/0141148 | A1 | | 7/2004 | Chou |
| 2005/0146675 | A1 | | 7/2005 | Benavides et al. |

FOREIGN PATENT DOCUMENTS

FR    2891064 A1    3/2007
* cited by examiner

*Primary Examiner* — Hung X Dang
(74) *Attorney, Agent, or Firm* — Bachman & LaPointe, P.C.

(57) ABSTRACT

Spectacles include an optical or solar façade connected to two sidepieces which are each connected to the façade by a shaft which is substantially perpendicular to the façade and which is used to rotate each sidepiece about itself between a use position and a storage position in front of the façade having a radius of curvature substantially equal to that of the sidepiece. The sidepiece is divided into two portions, namely a first portion solidly connected to the central rotational shaft and a second portion connected to the first by an intermediate translational movement device disposed between the two portions and gradually engaging the second portion during the rotation of the first and consequently the second so as to subject the latter to two combined movements, one rotational and the other linear, for the automatic and simultaneous lengthening of the sidepiece as it is rotated to the use position and the shortening of the sidepiece as it is rotated to the storage position.

11 Claims, 5 Drawing Sheets

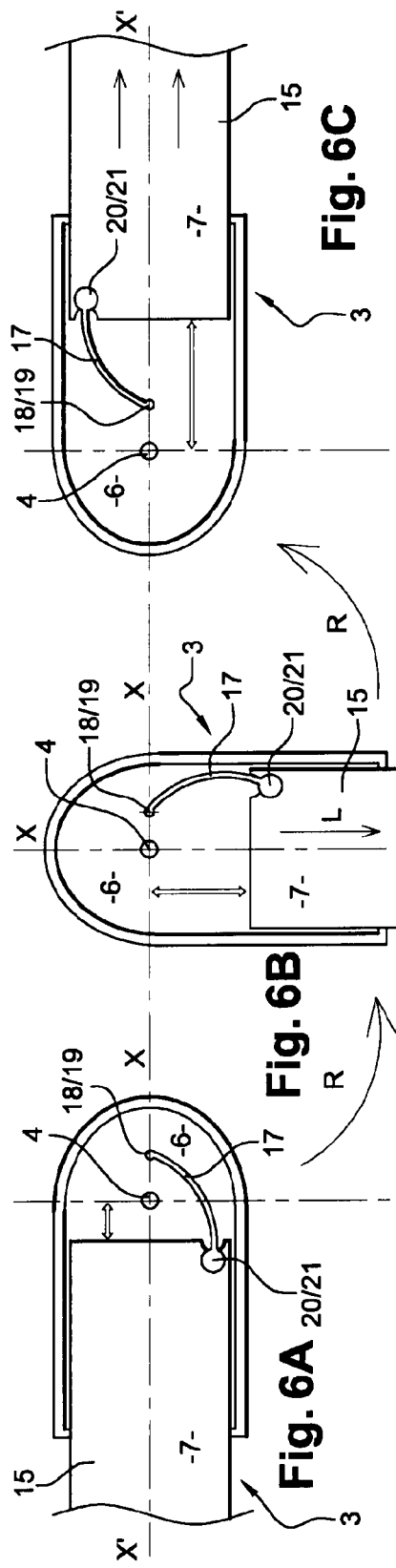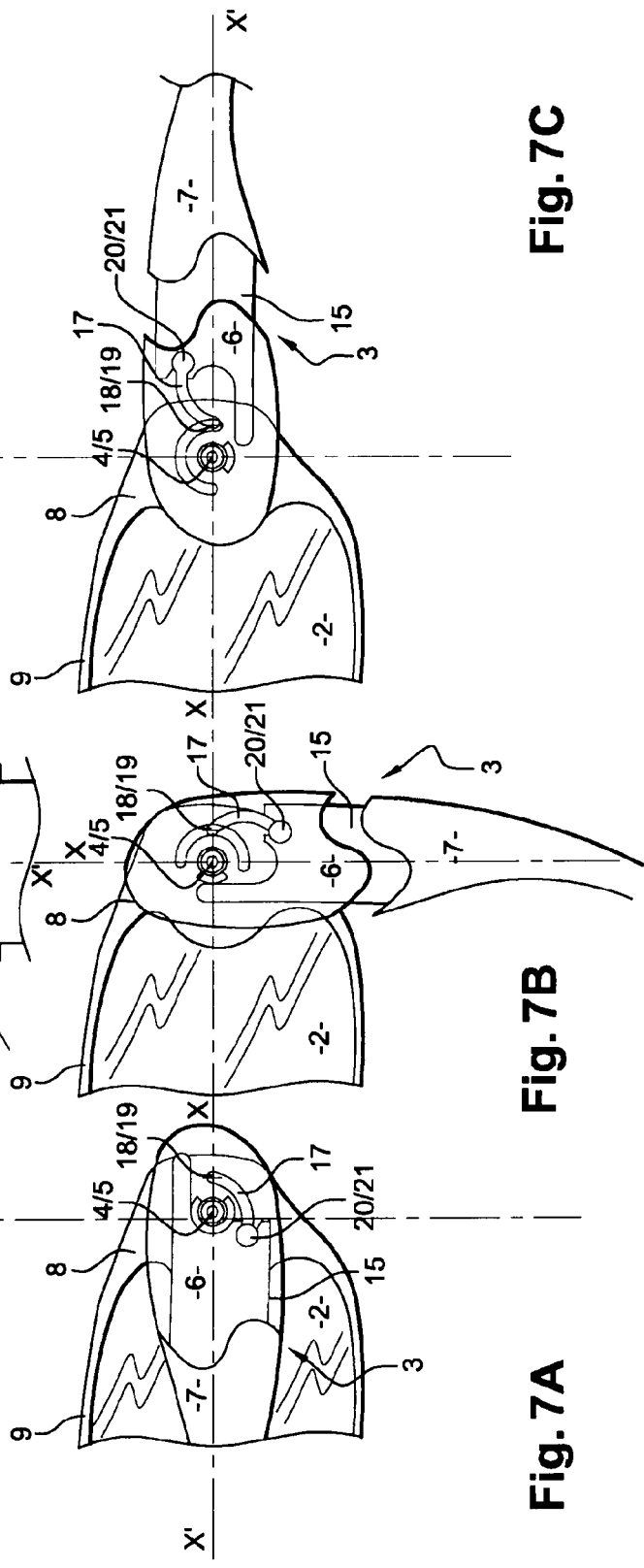

SPECTACLES HAVING RETRACTABLE SIDEPIECES

BACKGROUND

The present invention concerns spectacles consisting, generally speaking, of an optical or solar facade connected to two supporting sidepieces.

A major problem in the field of spectacles relates to their bulk in the storage position, i.e. after having folded the sidepieces relative to the optical or solar facade.

A good number of solutions to this problem have already been proposed, for example providing telescopic sidepieces also making it possible to adjust their length to the morphology of the user, but the high number of degrees of freedom obtained with slides or hinges causes a loss of stiffness of the sidepieces.

Moreover, voluntary or involuntary sudden movements of the user can cause unintentional lengthening or shortening of the sidepieces.

Still with the aim of reducing the bulk of the spectacles, folding spectacles have also been proposed, i.e. spectacles whose frame consists of two parts articulated together at the central bridge, thus enabling the two parts to be superposed.

Such folding spectacles combined with telescopic sidepieces are also known, but have the drawback of necessitating, when putting away or using the spectacles, a large number of operations to unfold them and then to adjust and to lock the length of each sidepiece.

SUMMARY OF THE INVENTION

An object of the present invention is to solve these various problems, essentially linked to the number of manipulations required to obtain a compact spectacle assembly in the storage position, to avoid manual adjustment of the length of the sidepieces, and finally to protect the lenses in a storage position of the spectacles assembly.

To this end, the invention concerns spectacles including an optical or solar facade connected to two sidepieces which are each connected to the facade by means of a pin which is substantially perpendicular to the facade and which is used to rotate each sidepiece on itself between a use position and a storage position in front of the facade, which has a radius of curvature substantially equal to that of the sidepiece, said spectacles being characterized in that said sidepiece is divided into two parts, namely a first part fastened to the central rotational pin and a second part connected to the first by intermediate translational drive means disposed between the two parts and progressively acting on the second part during the rotation of the first and consequently the second so as to subject the latter to two combined movements, one rotational and the other linear, for automatic and simultaneous lengthening of the sidepiece as it is turned toward a use position and shortening of the sidepiece as it is turned toward a storage position.

The invention also concerns the features that will emerge in the course of the following description, which should be considered separately or in all possible technical combinations.

BRIEF DESCRIPTION OF THE DRAWINGS

This description, given by way of nonlimiting example, will explain how the invention may be carried out with reference to the appended drawings, in which:

FIGS. 6A, 6B, 6C represent diagrammatically the kinematics of the device for driving the sidepiece simultaneously in rotation and in translation, in the embodiment of FIGS. 4 and 5, respectively in the shortened storage position, in an intermediate opening position, and in the position of maximum deployment of the sidepiece.

FIGS. 7A, 7B, 7C are similar to FIGS. 6A, 6B, 6C but are not diagrammatic and depict a concrete implementation.

DETAILED DESCRIPTION OF THE PREFERRED EMBODIMENT(S)

Figure 1:
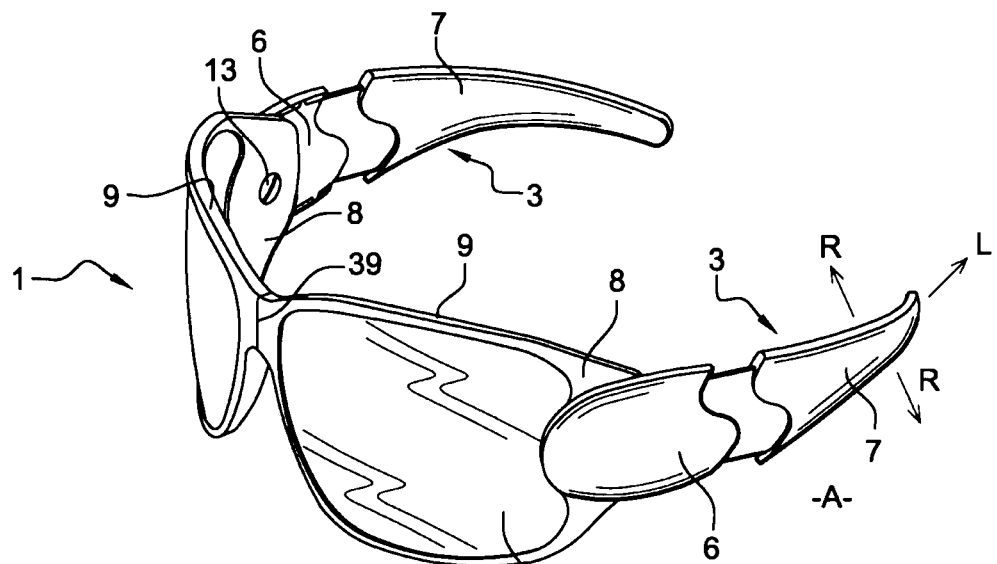
FIG. 1 is a perspective view of a pair of spectacles of the invention in the position of use, i.e. with the sidepieces lengthened to the maximum.
Figure 2:
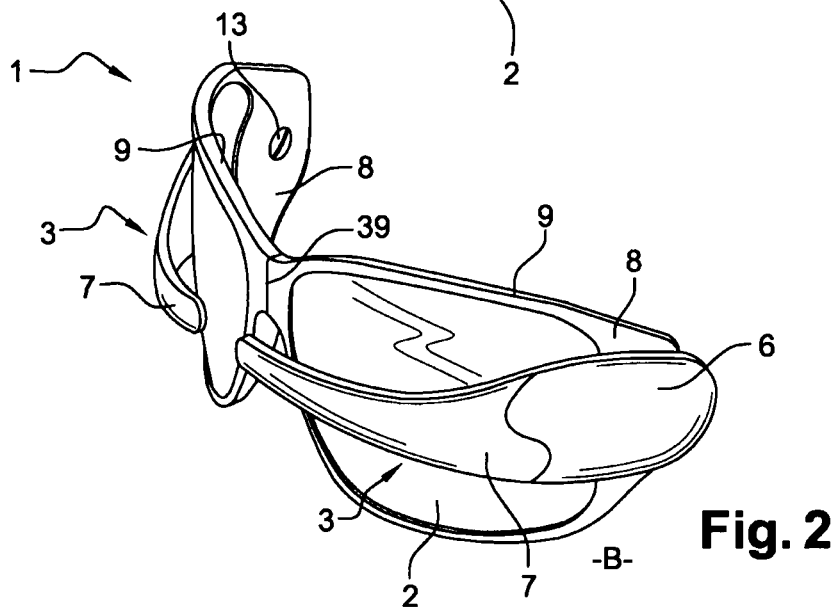
FIG. 2 is a perspective view of the spectacles from FIG. 1 in the storage position, i.e. with the sidepieces shortened to the maximum and in front of the optical face.
Figure 3:
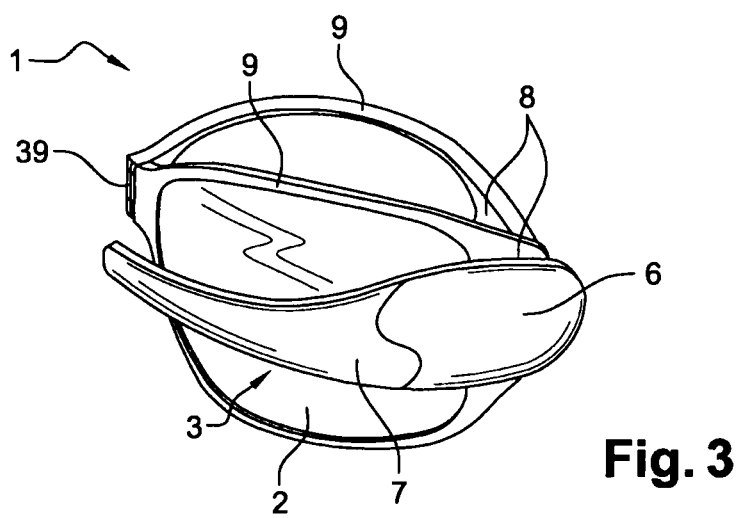
FIG. 3 is a perspective view of the spectacles from FIGS. 1 and 2 after stowing the sidepieces and folding the frame on itself.

The spectacles 1 clearly visible in their entirety in FIGS. 1, 2 and 3 consist of an optical or solar facade 2 connected to two sidepieces 3 each connected to the facade 2 by a pin 4, 5 substantially perpendicular thereto to enable rotation of the sidepiece 3 on itself between a position of use "A" and a storage position "B" in front of the facade 2, which has a radius of curvature substantially equal to that of the sidepiece 3.

According to the invention, said sidepiece 3 comprises two parts 6, 7, the first 6 being fastened to the central rotation pin 4, 5, the second 7 being connected to the first 6 by intermediate translation drive means disposed between the two parts and acting progressively on said second part 7 during the rotation of the first 6, and consequently of the second 7, to impart thereto two conjugate movements, one rotational "R", the other linear "L", in order to obtain automatically and simultaneously lengthening of the sidepiece when it is turned toward the position of use "A" and shortening of the same sidepiece when it is turned toward the storage position "B".

Of course, the sidepiece 3 is shaped at its free end to be able to come into contact with the ear of a user.

Figure 4:
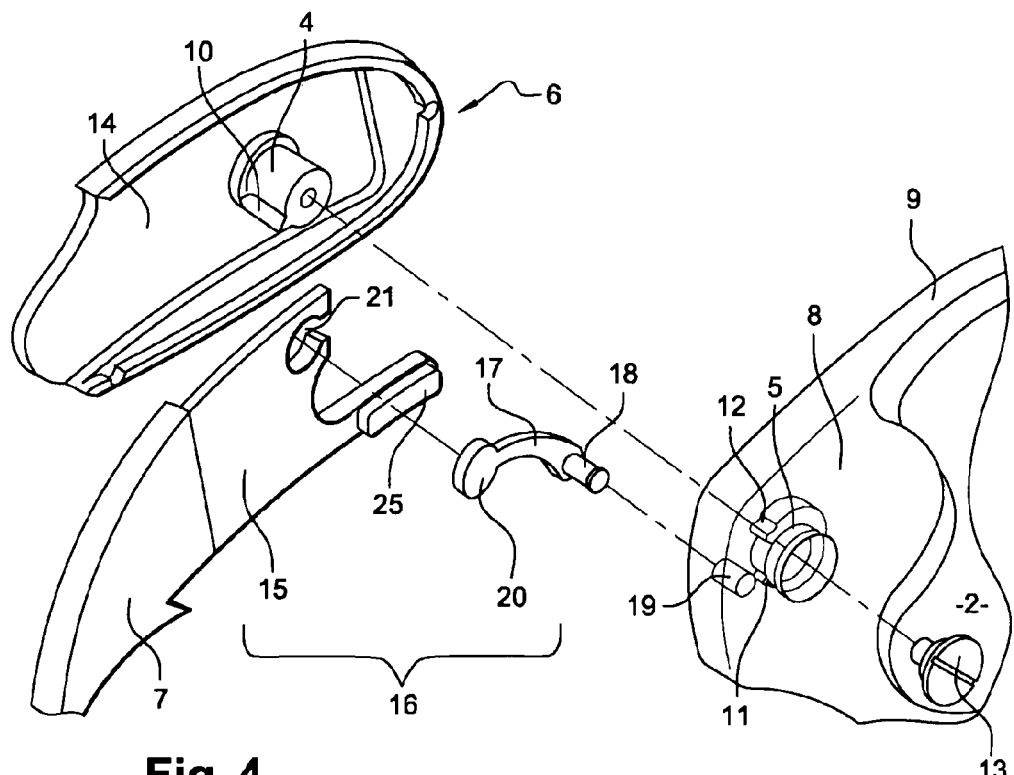
FIG. 4 is an exploded perspective detail view to a larger scale showing the mechanism for driving in translation a second sidepiece part relative to the first and relative to the frame, on which the sidepiece assembly is driven in rotation, in a first embodiment.
Figure 8:
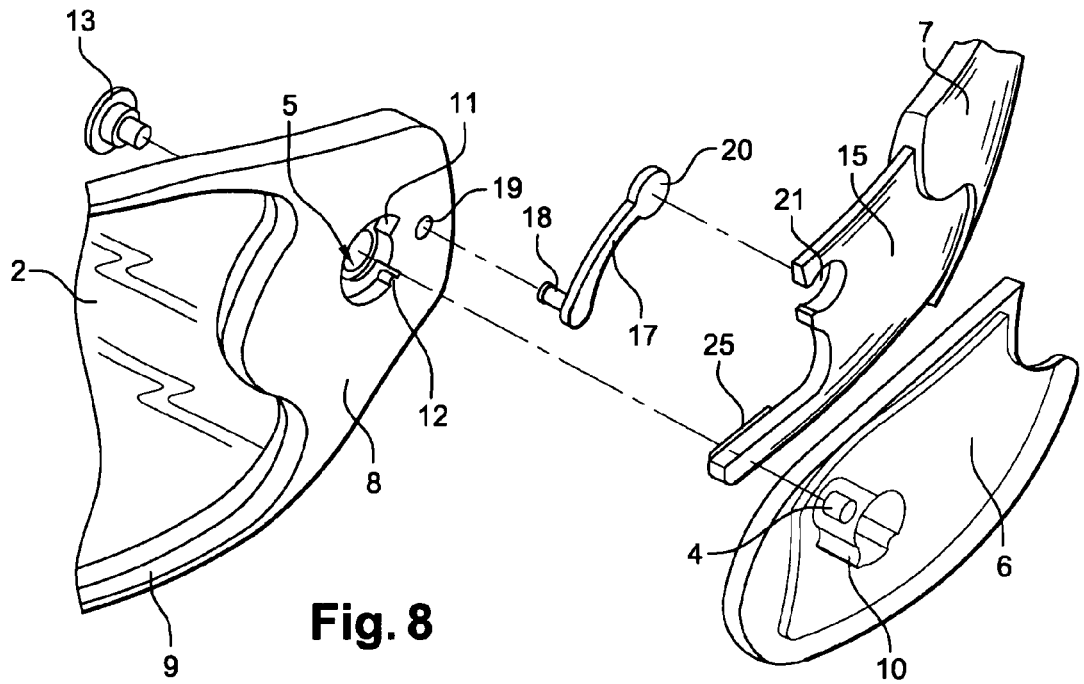
FIG. 8 is an exploded perspective detail view to a larger scale showing from a different direction compared to FIG. 4 the mechanism for driving a second sidepiece part in translation relative to the first and relative to the frame, on which the sidepiece assembly is driven in rotation, in a first embodiment.

As clearly visible in FIGS. 4 and 8, the central rotation pin of the first part 6 of the sidepiece 3 consists of a cylindrical stud 4 produced on said first part 6, adapted to turn in a corresponding housing 5 of an external end area 8 of a frame 9 or conversely supporting all or part of the optical facade 2, the pin 4 including an abutment 10 able to move between two fixed abutments 11, 12 of the housing 5 in order to delimit the range of angular movement in rotation of the sidepiece 3 relative to the frame 9.

Note that the frame 9 may be full or partial relative to the optical face 2. Thus the spectacles may be of the full frame, half frame or rimless type.

The mechanical connection between the end part 8 of the frame 9 and the rotary part 6 of the sidepiece 3 is effected by means of a screw 13 passing through the housing 5 of the part 8 of the frame 9 and cooperating with the pin 4 of the second rotary part 6 of the sidepiece 3.

Figure 5:
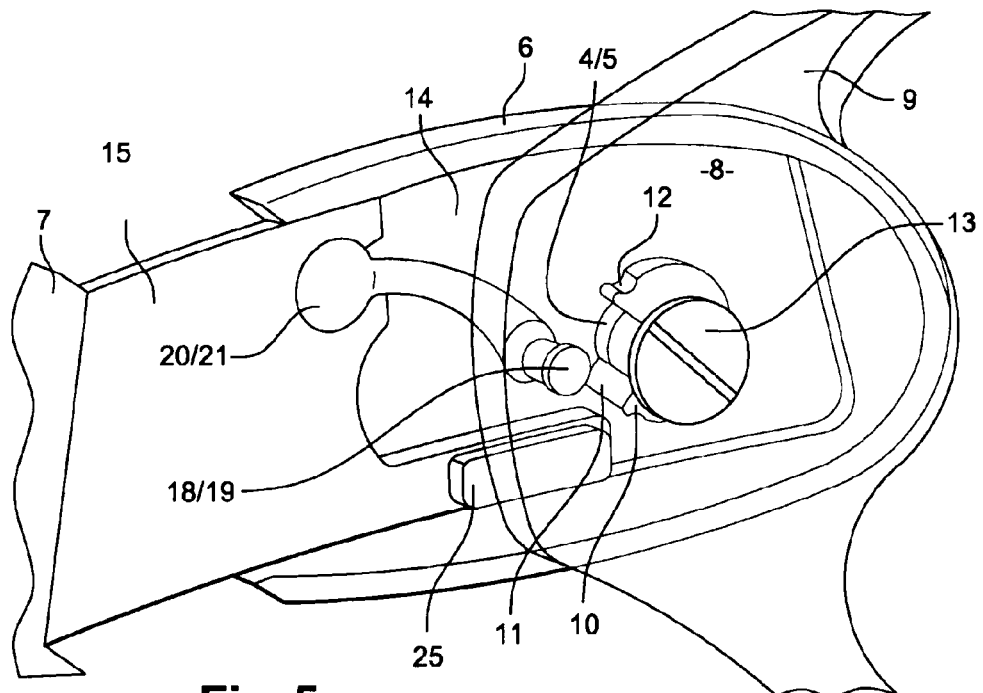
FIG. 5 is a perspective view to a larger scale than FIG. 4 after assembling the parts constituting the sidepiece relative to the frame.

According to another feature of the invention, as may be seen in FIGS. 4 and 5, the first part 6 of the sidepiece 3 connected to the central rotation pin 4, 5 of the frame 9 forms a cap 14 delimiting with the external face of the end area 8 of the frame 9 a sheath in which a guiding end area 15 of the second part 7 of the sidepiece 3 can slide in translation.

In a first embodiment represented in FIGS. 4 to 9, the means 16 for driving the second part 7 of the sidepiece 3 in translation during the rotation consist of a link 17. This is disposed between on the one hand a fixed articulation point 18, 19 situated at the end 8 of the frame 9 eccentrically relative to the rotation pin 4, 5 of said first part 6 and on the other hand another, this time mobile articulation point 20, 21 situated at the end of the second part 7 of the sidepiece 3 and offset relative to the longitudinal axis XX'. Said link 17 has a radius of curvature adapted to allow pivoting in rotation of the whole of the first part 6 and the second part 7 of the sidepiece 3 through an angle of substantially 180° while simultaneously allowing linear movement in translation of the second part 7 relative to the first 6.

To be more precise, the fixed articulation point of the link 17 consists of a first pin 18 produced at one end thereof cooperating in rotation with a hole 19 produced at the end 8 of the frame 9 eccentrically relative to the rotation pin 4, 5 of the part 6 of the sidepiece 3. The other, mobile articulation point of the link 17 consists of a second pin 20 produced at its other end able to cooperate with a corresponding housing 21 of the guide area 15 of the second part 7 of the sidepiece 3.

Figure 9:
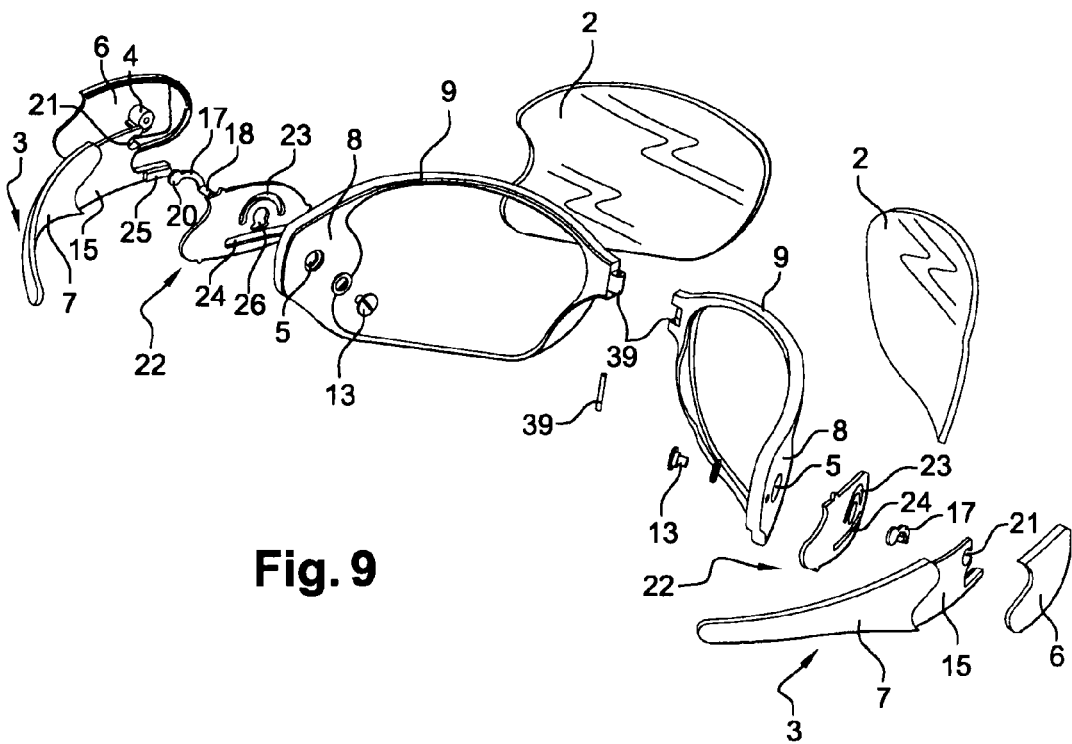
FIG. 9 is an exploded perspective view of the spectacles assembly of the embodiment of FIGS. 4 to 7.

According to another feature of the invention, represented in FIG. 9, an intermediate internal cap 22 is disposed between the internal face of the end area 8 of the frame 9 and the internal face of the cap 14 formed by the first part 6 of the sidepiece 3 in order to delimit therewith the sheath for the guiding end area 15 of the second part 7 of the sidepiece 3.

Moreover, the intermediate cap 22 comprises on the one hand a circular arc shaped clearance slot 23 the center of which is that of the central rotation pin 4, 5, adapted to allow rotational relative movement of the second part 7 of the sidepiece 3 relative to the first, fixed articulation pin 18 of the link 7 on the frame 9, and on the other hand an oblong rectilinear slot 24 for guiding movement in translation of and limiting the travel of a stud 25 of corresponding shape produced in line with the guiding end area 15 of the second part 7 of the sidepiece 3. Said intermediate cap 22 also comprises a hole 26 through which the central pin 4 of the sidepiece assembly 3 passes.

Figure 10:
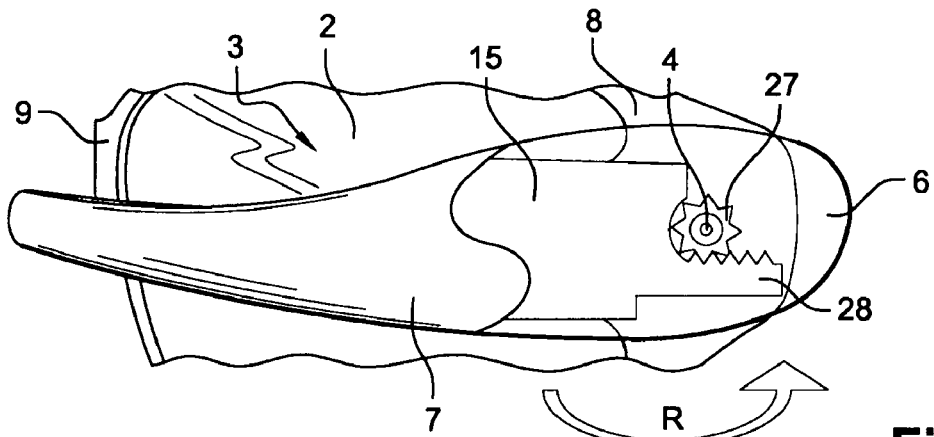
FIG. 10 shows a mechanism for driving in translation and in rotation a spectacles sidepiece of a second embodiment.

In a second embodiment shown in FIG. 10, the means for driving the second part 7 of the sidepiece 3 in translation during the rotation consist of a toothed wheel 27 fixed onto the central pin 4 of the first part 6 of the sidepiece 3, which toothed wheel 27 is driven one way or the other by a mobile linear drive rack 28 produced in the guiding end area 15 of the second part 7 of the sidepiece 3.

Figure 11:
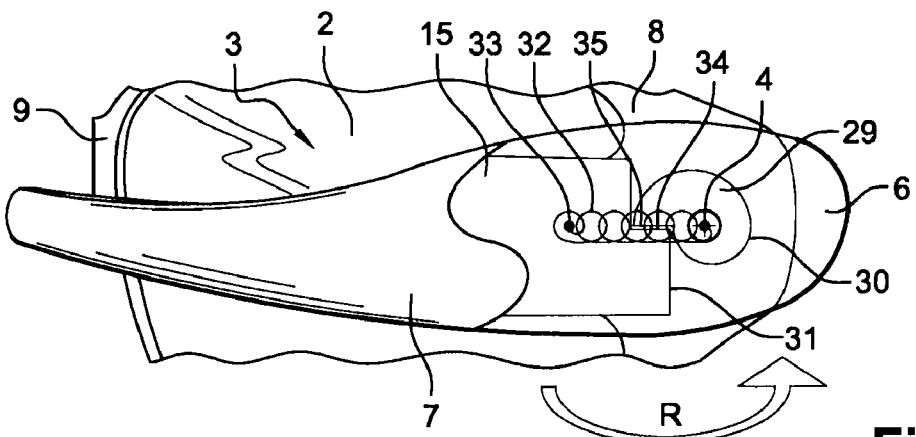
FIG. 11 shows a mechanism for driving in translation and in rotation a spectacles sidepiece of a third embodiment.
Figure 12:
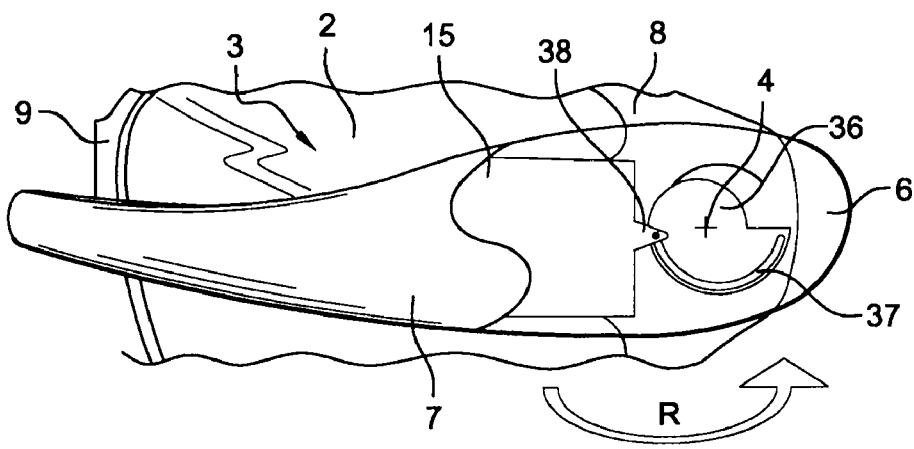
FIG. 12 shows a mechanism for driving in translation and in rotation a spectacles sidepiece of a fourth embodiment.

In the third embodiment represented in FIG. 11, the means for driving the second part 7 of the sidepiece 3 in translation during the rotation consist of a cam 29 fixed onto the central pin 4 of the first part 6 of the sidepiece 3 and on the external ramp 30 of which cam 29 bears a front plane 31 of the guiding end area 15 of the second part 7 of the sidepiece 3 for linear actuation thereof one way or the other.

As may be seen in FIG. 11, a return spring 32 operates in tension between the pin 4 and a fixed point 33 situated in the guiding end area 15.

There is also provided a stop for stopping rotation of the sidepiece by means of a plane 34 perpendicular to the front plane 31 on which a corresponding plane 35 of the cam 29 disposed substantially radially relative to its axis comes to bear.

In a fourth embodiment, the means for driving the second part 7 of the sidepiece 3 in translation during the rotation consist of a cam 36 fixed onto the central pin 4 of the first part 6 of the sidepiece 3, said cam 36 having on one of its flanks a guide slot 37 following the same profile and in which a finger 38 produced on the guiding end area 15 of the second part 7 of the sidepiece 3 can slide for linear actuation thereof one way or the other.

According to another feature of the invention, as clearly visible in FIGS. 3 and 9, the frame 9 consists of two separate parts articulated symmetrically about a central pivot pin 39. This allows the spectacles to be folded up on themselves to reduce their bulk. Each of the sidepieces 3 is then stowed in front of the optical facade 2 of substantially identical curvature for a supplementary reduction of bulk at the same time as protecting said facade. The sidepieces 3 are retracted automatically during this operation and so do not exceed the length of a half-frame. Thus a maximum compactness effect is obtained.

Note that the various components of the spectacles described above are preferably produced in plastic material by injection molding, in metal by injection molding or in sintered metal. They may also be produced by shaping metals or composite materials.

The invention claimed is:

1. Spectacles including an optical or solar facade connected to two sidepieces which are each connected to the facade by a central rotational pin which is substantially perpendicular to the facade and which is used to rotate each sidepiece on itself between a use position and a storage position in front of the facade, which has a radius of curvature substantially equal to that of the respective sidepiece, each said sidepiece being divided into two parts including a first part fastened to the central rotational pin and a second part connected to the first part by intermediate translational drive means disposed between the first and second parts and progressively acting on the second part during the rotation of the first part and consequently the second part so as to subject the second part to two combined movements, wherein one of the movements is rotational and another of the movements is linear, for automatic and simultaneous lengthening of a respective one of said sidepieces as the respective sidepiece is turned toward a use position and shortening of the respective sidepiece as the respective sidepiece is turned toward a storage position.

2. Spectacles as claimed in claim 1, wherein the central rotation pin of the first part of the sidepiece consists of a cylindrical stud produced on said first part adapted to turn in a corresponding housing in an external end area of a frame or conversely supporting all or part of the optical facade, the pin including an abutment able to move between two fixed abutments of the housing in order to limit angular movement in rotation of the respective sidepiece relative to the frame.

3. Spectacles as claimed in claim 2, wherein the first part of the respective sidepiece connected to the central rotation pin of the frame forms a cap delimiting with an external face of the end area of the frame a sheath in which a guiding end area of the second part of the respective sidepiece is able to slide in translation.

4. Spectacles as claimed in claim 3, wherein an intermediate internal cap is disposed between the internal face of the end area of the frame and the internal face of the cap formed by the first part of the respective sidepiece in order to delimit therewith the sheath for the guiding end area of the second part of the respective sidepiece.

5. Spectacles as claimed in claim 4, wherein the intermediate cap includes on the one hand a clearance slot of circular arc shape, the center of which is that of the central rotation pin, adapted to allow rotary movement of the second part of the respective sidepiece relative to the first, fixed articulation pin of the link on the frame and on the other hand a straight oblong slot for guiding in translation and limiting the travel of a stud of corresponding shape formed in line with the guiding end area of the second part of the respective sidepiece and said intermediate cap also including a hole through which the central rotation pin of the sidepiece assembly passes.

6. Spectacles as claimed in claim 3, wherein the means for driving the second part of the respective sidepiece in translation during the rotation consist of a toothed wheel fixed onto the central pin of the first part of the respective sidepiece which toothed wheel is driven one way or the other by a mobile linear drive rack produced on the guiding end area of the second part of the respective sidepiece.

7. Spectacles as claimed in claim 3, wherein the means for driving the second part of the respective sidepiece in translation during the rotation consist of a cam fixed onto the central pin of the first part of the respective sidepiece and on the external ramp of which cam bears a front plane of the guiding end area of the second part of the respective sidepiece for linear actuation thereof one way or the other.

8. Spectacles as claimed in claim 3, wherein the means for guiding the second part of the respective sidepiece in translation during the rotation consist of a cam fixed onto the central pin of the first part of the respective sidepiece, said cam having on one of its flanks a guide slot following the same profile in which a finger produced in the guiding end area of the second part of the respective sidepiece can slide for linear actuation thereof one way or the other.

9. Spectacles as claimed in claim 2, wherein the means for driving the second part of the respective sidepiece in translation during the rotation consist of a link disposed between on the one hand a fixed articulation point situated at the end of the frame eccentrically relative to the rotation pin of said first part and on the other hand another, mobile articulation point situated at the end of the second part of the respective sidepiece and offset relative to a longitudinal axis, said link having a radius of curvature adapted to allow pivoting in rotation of the assembly of the first part and the second part of the respective sidepiece through an angle of substantially 180° while simultaneously allowing linear movement in translation of the second part relative to the first part.

10. Spectacles as claimed in claim 9, wherein the fixed articulation point of the link consists of a first pin produced at one end thereof cooperating in rotation with a hole produced at the end of the frame eccentrically relative to the rotation pin of the first part of the respective sidepiece and the other, mobile articulation point of the link consists of a second pin produced at its other end and adapted to cooperate with a corresponding housing of the guiding area of the second part of the respective sidepiece.

11. Spectacles as claimed in claim 2, wherein the frame consists of two separate parts articulated symmetrically about a central pivot pin to enable folding of the spectacles on themselves to reduce their bulk, each of the sidepieces being stowed in front of the optical facade of substantially identical curvature for a supplementary reduction of bulk whilst protecting said facade, and the sidepieces being retracted automatically during this operation so as not to exceed the length of a half-frame, for a maximum compactness effect.

* * * * *